US008729846B2

(12) United States Patent
Nakata

(10) Patent No.: US 8,729,846 B2
(45) Date of Patent: May 20, 2014

(54) MOTOR DRIVE SYSTEM AND CONTROL METHOD THEREOF

(75) Inventor: Hideki Nakata, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/810,304

(22) PCT Filed: Apr. 23, 2012

(86) PCT No.: PCT/JP2012/002777
§ 371 (c)(1),
(2), (4) Date: Jan. 15, 2013

(87) PCT Pub. No.: WO2013/057853
PCT Pub. Date: Apr. 25, 2013

(65) Prior Publication Data
US 2013/0187588 A1 Jul. 25, 2013

(30) Foreign Application Priority Data

Oct. 17, 2011 (JP) ................... 2011-227802

(51) Int. Cl.
H02P 1/04 (2006.01)
H02P 6/16 (2006.01)
H02P 7/00 (2006.01)
H02P 27/00 (2006.01)
H02P 27/04 (2006.01)

(52) U.S. Cl.
USPC ...... 318/430; 318/400.04; 318/432; 318/434; 318/716; 318/800; 318/801; 318/807; 318/809; 318/811

(58) Field of Classification Search
USPC ............ 318/400.04, 430, 432, 434, 716, 800, 318/801, 807, 809, 811
See application file for complete search history.

(56) References Cited

U.S. PATENT DOCUMENTS 4,758,117 A 7/1988 Maki et al.
5,583,406 A 12/1996 Mutoh et al.
(Continued)

FOREIGN PATENT DOCUMENTS

CN 1783698 7/2006
CN 101005244 7/2007
(Continued)

OTHER PUBLICATIONS

International Search Report issued Jul. 24, 2012 in corresponding International Application No. PCT/JP2012/002777.

(Continued)

Primary Examiner — Eduardo Colon Santana
Assistant Examiner — Gabriel Agared
(74) Attorney, Agent, or Firm — Wenderoth, Lind & Ponack, L.L.P.

(57) ABSTRACT

A motor drive system includes an inverter that supplies power to a three-phase motor, and a control unit that, when first stopping and then commencing supply of alternating current to three phases of the three-phase motor, switches from first control to third control and then to second control. The first control places switching elements in the inverter in a non-conduction state, the second control is a PWM control of the switching elements, and the third control places and keeps a switching element of each of an upper arm and a lower arm in the conduction state until commencement of the supply of current. The upper arm corresponds to a phase through which current flows in a direction entering the motor upon commencement of the supply, and the lower arm corresponds to a phase through which current flows in a direction exiting the motor upon commencement of the supply.

15 Claims, 13 Drawing Sheets

(56) References Cited

U.S. PATENT DOCUMENTS

| | | | |
|---|---|---|---|
| 6,388,416 B1 * | 5/2002 | Nakatani et al. | 318/700 |
| 6,538,404 B2 * | 3/2003 | Kato et al. | 318/400.06 |
| 7,129,672 B2 * | 10/2006 | Kimura et al. | 318/716 |
| 7,330,011 B2 * | 2/2008 | Ueda et al. | 318/807 |
| 2004/0032230 A1 * | 2/2004 | Schwarz et al. | 318/254 |
| 2004/0124807 A1 * | 7/2004 | Nakata et al. | 318/801 |
| 2004/0169488 A1 | 9/2004 | Maeda et al. | |
| 2011/0029179 A1 | 2/2011 | Miyazaki et al. | |
| 2011/0062908 A1 * | 3/2011 | Kitanaka | 318/400.22 |
| 2013/0076279 A1 | 3/2013 | Abel et al. | |

FOREIGN PATENT DOCUMENTS

| | | |
|---|---|---|
| EP | 1 320 187 | 6/2003 |
| JP | 61-157269 | 7/1986 |
| JP | 5-153705 | 6/1993 |
| JP | 7-143611 | 6/1995 |
| JP | 7-147782 | 6/1995 |
| JP | 8-182381 | 7/1996 |
| JP | 9-56162 | 2/1997 |
| JP | 10-243680 | 9/1998 |
| JP | 2003-164009 | 6/2003 |
| JP | 2011-15515 | 1/2011 |
| JP | 2011-36008 | 2/2011 |
| JP | 2011-67043 | 3/2011 |
| JP | 2011-250671 | 12/2011 |
| WO | 2011/157553 | 12/2011 |

OTHER PUBLICATIONS

Written Opinion of the International Searching Authority issued Jul. 24, 2012 in corresponding International Application No. PCT/JP2012/002777 (with English translation).

Extended European Search Report dated Jan. 23, 2014 in European Application No. 12799040.6.

Chinese Office Action with English Translation of Search Report dated Nov. 26, 20 2013 in Chinese Application No. 201280002065.9.

* cited by examiner

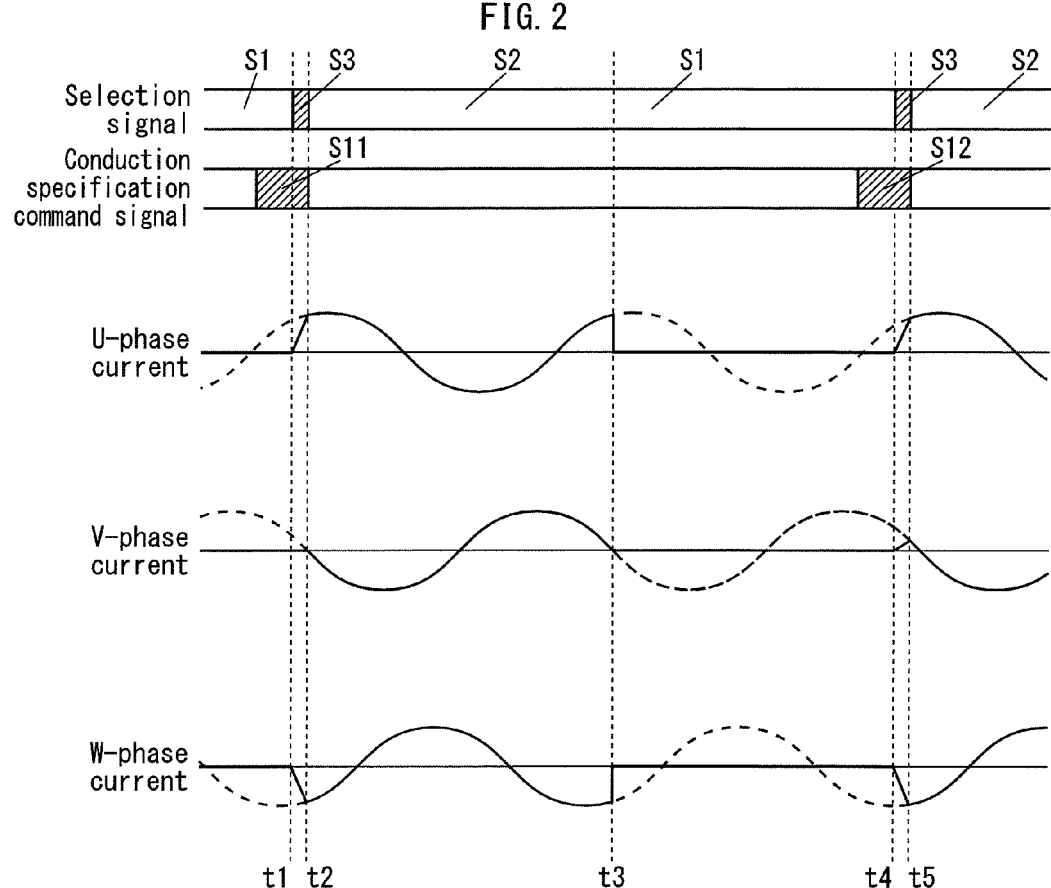

| Section | 14UP | 14UN | 14VP | 14VN | 14WP | 14WN |
|---|---|---|---|---|---|---|
| ① | Adjusted ON | — | ON | — | — | ON |
| ② | ON | — | Adjusted ON | — | — | ON |
| ③ | ON | — | — | Adjusted ON | — | ON |
| ④ | ON | — | — | ON | — | Adjusted ON |
| ⑤ | ON | — | — | ON | Adjusted ON | — |
| ⑥ | Adjusted ON | — | — | ON | ON | — |
| ⑦ | — | Adjusted ON | — | ON | ON | — |
| ⑧ | — | ON | — | Adjusted ON | ON | — |
| ⑨ | — | ON | Adjusted ON | — | ON | — |
| ⑩ | — | ON | ON | — | Adjusted ON | — |
| ⑪ | — | ON | ON | — | — | Adjusted ON |
| ⑫ | — | Adjusted ON | ON | — | — | ON |

US 8,729,846 B2

MOTOR DRIVE SYSTEM AND CONTROL METHOD THEREOF

BACKGROUND OF INVENTION

1. Technical Field

The present invention relates to a motor drive system that is provided with an inverter for driving a motor and a control unit.

2. Background Art

In recent years, electric vehicles driven by electric motors are gaining popularity. An electric vehicle is equipped with a motor that is capable of generating drive torque for driving the vehicle, and includes an inverter that generates three-phase alternating current to be supplied to the motor and a control unit that controls the inverter. When performing control of the motor, it is important to increase the efficiency with which the motor is driven in order to reduce electric energy consumption of the motor as much as possible.

FIG. 12 illustrates a correlation between a rotation speed of a conventional motor, torque generated by the motor, and energy efficiency of the motor. As can be seen from FIG. 12, the energy efficiency of the motor changes depending upon both the rotation speed of the motor and the torque generated by the motor. In other words, even when the rotation speed of the motor does not change, the energy efficiency of the motor changes when the torque generated by the motor changes. In relation to this, conventional technology discloses a motor drive system that drives a motor intermittently at a drive point realizing high energy efficiency, thereby realizing a reduction in average energy loss of the motor and an increase in overall energy efficiency of the motor (e.g., Patent Literature 1). Note that intermittent drive of a motor as discussed above refers to a state where a motor is driven so as to generate torque discontinuously.

FIG. 13 is a timing chart indicating a chronological change in torque generated by the motor when the motor drive technology disclosed in Patent Literature 1 is applied.

As can be seen from FIG. 13, within a period of a powering state where drive torque needs to be generated by the electric motor, the control unit sets, in alternation, a first drive period and a second drive period. The first drive period is a period during which the electric motor is driven according to a first drive torque command value that indicates a smaller torque value than a demanded torque value. On the other hand, the second drive period is a period during which the electric motor is driven according to a second drive torque command value that indicates a larger torque value than the demanded torque value. Here, the demanded torque value is a torque value that is determined according to the direction of an accelerator. Further, a ratio between the first drive period and the second drive period within the period of the powering state is set such that an average value of the first drive torque and the second drive torque generated by the electric motor during the period of the powering state is within a predetermined error range of the demanded torque value. In addition, the energy efficiency of the electric motor, when driven according to the second drive torque command value, is set so as to indicate a higher value than the energy efficiency of the electric motor, when driven according to the demanded torque value.

By driving the electric motor in such a manner, the overall energy efficiency of the electric motor when averaging the first drive torque and the second drive torque during the period of the powering state is higher than the energy efficiency of the electric motor when the electric motor continuously outputs the demanded torque in accordance with the direction of the accelerator. As such, by setting two drive torque command values as described above, and further, by changing the torque generated by the electric motor by performing alternate switching between the two drive torque command values as illustrated in FIG. 13, the overall energy efficiency of the electric motor within the period of the powering state is improved while it is ensured that the torque generated by the electric motor equals the demanded torque without excess or deficiency.

CITATION LIST

Patent Literature

[Patent Literature 1]
Japanese Patent Application Publication No. 2011-67043

SUMMARY OF INVENTION

However, Patent Literature 1 includes no specific disclosure concerning specific operations of the inverter when transition takes place from a first state where the supply of current to the motor is suspended in accordance with the first drive torque command value to a second state where the supply of three-phase alternating current to the motor is performed in accordance with the second drive torque command value. Commonly, regardless of whether or not the intermittent operation as described above is performed, switching elements included in the inverter are put in a non-conduction state when suspending the supply of current to the motor, whereas the switching elements are operated according to PWM (Pulse Width Modulation) control such that three-phase alternating current is supplied to the motor when performing the supply of three-phase alternating current to the motor. Due to this, also during the intermittent operation as described above, a method can be conceived of simply switching from a first control of putting the switching elements in the non-conduction state to a second control of performing PWM control of the switching elements upon transition from the first state that is in accordance with the first drive torque command value to the second state that is in accordance with the second drive torque command value.

In the meantime, a certain amount of time is required for transition from the suspension of the supply of current to the motor to the commencement of the supply of three-phase alternating current to the motor. When a relatively large amount of time is required for the above-described transition, accordingly, the period from when control of the switching elements is commenced for causing the motor to generate the second drive torque until when the motor actually generates the second drive torque is extended. Due to this, the period during which the motor generates the second drive torque is shortened, which brings about an undesirable situation where (i) the preset ratio between the first drive period, during which the first drive torque is to be generated, and the second drive period, during which the second drive torque is to be generated, and (ii) the ratio between the period during which the first drive torque is actually generated and the period during which the second drive torque is actually generated are not in agreement. Further, torque generated by the motor gradually increases from the first drive torque (zero) to the second drive torque during the period of transition from the suspension of the supply of current to the commencement of the supply of three-phase alternating current. As such, the motor is driven in a state of low energy efficiency during this period. Hence, it is desirable that the amount of time required for the transition from the suspension of the supply of current to the commencement of the supply of three-phase alternating current be reduced as much as possible.

In view of the aforementioned problems, the present invention provides a motor drive system that realizes a reduction in the amount of time required for the transition from the suspension of the supply of current to the commencement of the supply of three-phase alternating current by improving operations of the inverter particularly when commencing the supply of three-phase alternating current to the motor after suspending the supply of current to the motor.

One aspect of the present invention is a motor drive system comprising: an inverter that supplies power to a three-phase motor by supplying alternating current to three phases of the three-phase motor, the inverter including at least three upper arms and at least three lower arms, each of the at least three upper arms and each of the at least three lower arms including a switching element and a freewheeling diode that are connected in parallel; and a control unit that performs control of the switching elements included in the inverter by switching between a first control, a second control, and a third control, wherein the first control is control of putting the switching elements in a non-conduction state and thereby causing the inverter to stop the supply of alternating current to the three phases, the second control is control of causing the switching elements to repeatedly switch between a conduction state and the non-conduction state and thereby causing the inverter to perform the supply of alternating current to the three phases, and the third control is control of putting and keeping a switching element of an upper arm, among the at least three upper arms, and a switching element of a lower arm, among the at least three lower arms, in the conduction state from commencement of the third control until commencement of the supply of alternating current to the three phases, the switching element of the upper arm corresponding to a phase, among the three phases, through which alternating current is to flow in a first direction entering the three-phase motor upon commencement of the supply of alternating current to the three phases, the switching element of the lower arm corresponding to a phase, among the three phases, through which alternating current is to flow in a second direction exiting the three-phase motor upon commencement of the supply of alternating current to the three phases, and when causing the inverter to stop the supply of alternating current to the three phases and then to commence the supply of alternating current to the three phases, the control unit switches from the first control to the third control and then to the second control.

According to the above-described structure of the motor drive system pertaining to one aspect of the present invention, the amount of time required for the transition from the suspension of the supply of current to the motor to the commencement of the supply of three-phase alternating current to the motor is reduced.

BRIEF DESCRIPTION OF THE DRAWINGS

FIG. 2 is a waveform diagram illustrating one example of a selection signal and motor currents during time-division control.

DETAILED DESCRIPTION OF INVENTION

Figure 1:
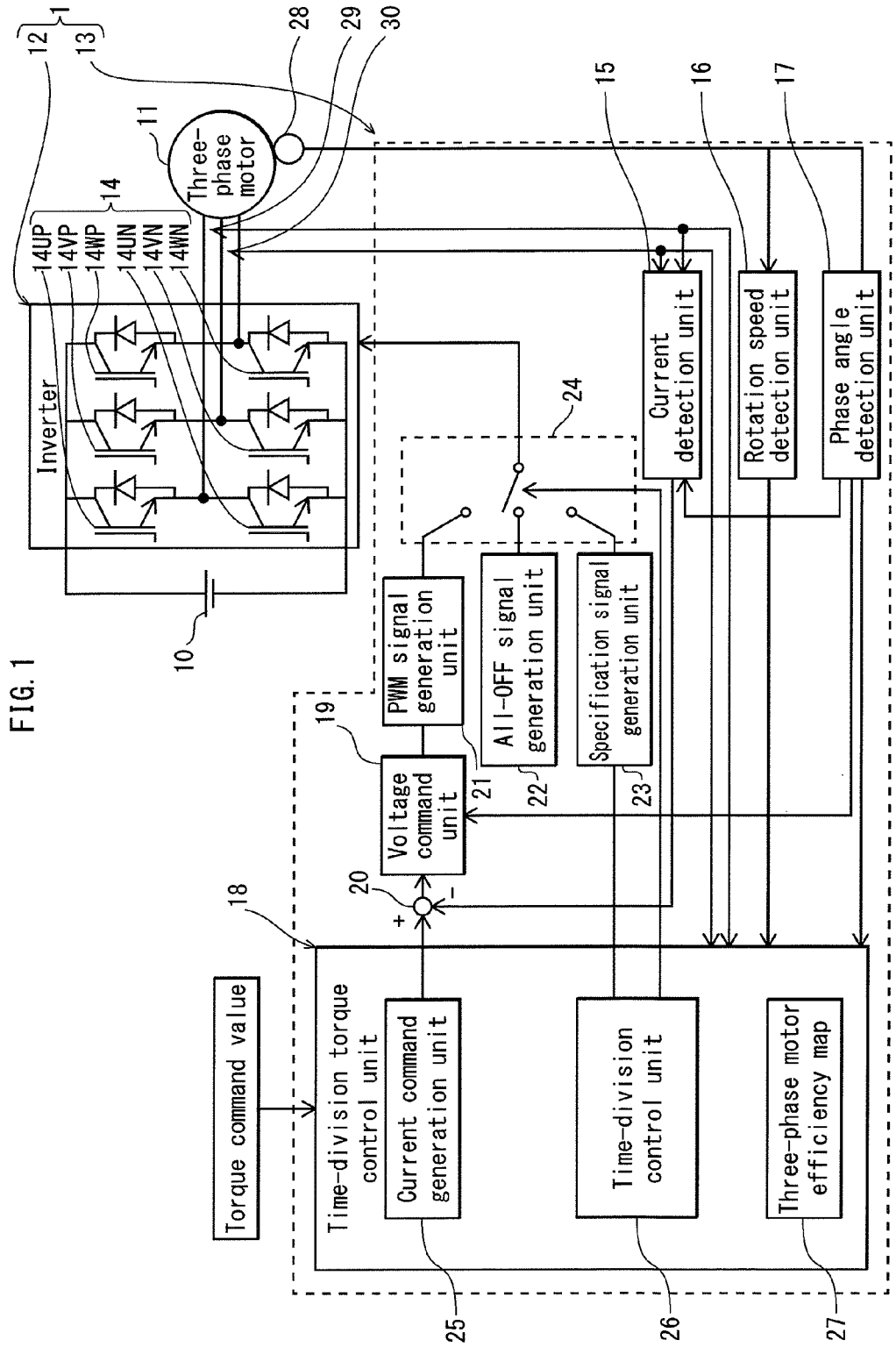
FIG. 1 is a block diagram indicating a structure of a motor drive system pertaining to embodiment 1.

According to the present invention, when commencing supply of three-phase alternating current to the motor following suspension of the supply of current to the motor, switching is performed from the first control to the third control, and then to the second control, rather than directly switching from the first control to the second control. When commencing the supply of three-phase alternating current to the motor and thereby causing the motor to generate torque, it is necessary to change currents flowing through three phases of the motor such that current values of the three phases reach the corresponding current values required for generation of torque from zero. In order as to change the currents flowing through the three phases of the motor in the above-described manner, PWM control may be utilized, where the switching elements are caused to repeatedly switch between the non-conduction state and the conduction state, or the third control may be utilized, where specific ones of the switching elements are put and kept in the conduction state. However, PWM control includes periods during which the switching elements are in the non-conduction state. Due to this, the rate of the change of the currents is relatively small when PWM control is utilized, and hence, a relatively large amount of time is required for changing the currents so that the current values reach the current values required in the second control for the generation of torque. In contrast, specific ones of the switching elements are put and kept in the conduction state when the third control is performed. Due to this, the third control does not include periods during which the specific ones of the switching elements are in the non-conduction state. As such, the rate of the change of the currents is relatively large compared to when PWM control is performed, and as a result, the amount of time required for changing the currents so that the current values reach the corresponding current values required in the second control for the generation of torque is reduced. As such, by executing the third control when commencing the supply of three-phase alternating current to the motor following the suspension of the supply of current to the motor, the amount of time required for the transition from the suspension of the supply of current to the motor to the commencement of the supply of three-phase alternating current to the motor is reduced.

In addition, motor efficiency is commonly relatively low during the period of the transition from the suspension of the supply of current to the motor to the commencement of the supply of three-phase alternating current to the motor. However, the present invention realizes a reduction in the amount of time required for the transition from the suspension of the supply of current to the motor to the commencement of the supply of three-phase alternating current to the motor, and thereby realizes a reduction in energy loss during the period of transition. Further, since the present invention realizes a reduction in the amount of time required for the transition, a period during which the motor generates torque corresponding to maximum energy efficiency is extended, and in addition, a period, preceding the commencement of the supply of three-phase alternating current to the motor, during which the generation of torque by the motor is suspended can be extended. As such, the present invention provides a motor drive system that realizes a further reduction in energy loss of the motor.

In the following, description is provided on a motor drive system that is one exemplary implementation of the present invention, with reference to the accompanying drawings.

Embodiment 1

1. Overall Structure

FIG. 1 is a block diagram indicating a structure of a motor drive system 1 pertaining to embodiment 1. As illustrated in FIG. 1, the motor drive system 1 is composed of an inverter 12 and a control unit 13.

The inverter 12 includes a three-phase bridge circuit composed of: a U-phase upper arm including a switching element 14UP and a freewheeling diode; a U-phase lower arm including a switching element 14UN and a freewheeling diode; a V-phase upper arm including a switching element 14VP and a freewheeling diode; a V-phase lower arm including a switching element 14VN and a freewheeling diode; a W-phase upper arm including a switching element 14WP and a freewheeling diode; and a W-phase lower arm including a switching element 14WN and a freewheeling diode. Note that the switching elements 14UP through 14WN are referred to as "switching elements 14" unless when it is necessary to distinguish the switching elements one from another. Each of the switching elements 14 is connected in parallel with a corresponding freewheeling diode. Each of the switching elements 14 may be implemented, for instance, by using an IGBT (Insulated Gate Bipolar Transistor) or a MOSFET (Metal Oxide Semiconductor Field Effect Transistor). The IGBT and the MOSFET may each be a switching element made from silicon (Si) or a switching element made from silicon carbide (SiC). During a powering state of the motor drive system 1, the inverter 12 performs DC/AC conversion on direct current power output from a power source 10 and supplies alternating current power to a motor 11. In contrast, during a regenerative state of the motor drive system 1, the inverter 12 converts alternating current power generated by the motor 11 into direct current power and supplies direct current power to the power source 10.

The power source 10 may be implemented, for instance, by using a rechargeable battery such as a lithium ion battery and a nickel-metal hydride battery. Further, as a matter of course, the motor drive system 1 may include a capacitance element, such as a capacitor, that is connected in parallel with the power source 10.

The motor 11 is a three-phase motor that is connected with the inverter 12 and that functions as a power source of an electric vehicle. The three-phase motor 11 may be implemented, for instance, by using an interior permanent magnet synchronous motor or a surface magnet type synchronous motor having magnets disposed on a surface thereof.

2. Detailed Structure of Control Unit 13

The control unit 13 includes: a current detection unit 15; a rotation speed detection unit 16; a phase angle detection unit 17; a time-division torque control unit 18; a comparison unit 20; a voltage command unit 19; an all-OFF signal generation unit 22; a PWM signal generation unit 21; a specification signal generation unit 23; a selector 24; a motor sensor 28; and current detection sensors 29 and 30. The motor sensor 28 may be implemented, for instance, by using a resolver, a rotary encoder, or a sensor using Hall effect.

The current detection unit 15 detects currents of at least two of a U-phase, a V-phase, and a W-phase of the three-phase motor 11. Further, the current detection unit 15 performs dq conversion by using the detected currents and a rotation phase angle of the three-phase motor 11 detected by the phase angle detection unit 17.

Detailed description on the phase angle detection unit 17 is provided in the following. A d-axis current and a q-axis current yielded as a result of the dq conversion are output to the comparison unit 20.

The rotation speed detection unit 16 detects the rotation speed of the three-phase motor 11 by detecting the number of rotations of a rotor of the three-phase motor 11 per unit time period by utilizing the motor sensor 28 provided to the three-phase motor 11, and outputs the rotation speed to the time-division torque control unit 18. By detecting the number of rotations of the rotor per unit time period, the actual rotation speed of the three-phase motor 11 can be detected.

The phase angle detection unit 17 detects a rotation phase angle of the rotor of the three-phase motor 11 by utilizing the motor sensor 28 provided to the three-phase motor 11, and outputs the rotation phase angle of the rotor to each of the current detection unit 15, the voltage command unit 19, and the time-division torque control unit 18.

The time-division torque control unit 18 includes a current command generation unit 25, a time-division control unit 26, and a three-phase motor efficiency map 27. The time-division torque control unit 18 determines an appropriate control method according to which the inverter 12 is to be operated in accordance with a torque command value, currents of the three phases of the three-phase motor 11, the rotation speed of the three-phase motor 11, and the rotation phase angle of the three-phase motor 11. In specific, the time-division torque control unit 18 determines which control is to be performed among (i) a time-division control according to which switching between supply of three-phase alternating current to the three-phase motor 11 and suspension of the supply of current to the three-phase motor 11 is repeatedly performed and (ii) a normal control according to which the supply of alternating current to the three-phase motor 11 is continuously performed. The determination is performed by the time-division torque control unit 18 comparing energy efficiency of the three-phase motor 11 when the time-division control is performed and energy efficiency of the three-phase motor 11 when the normal control is performed. The time-division torque control unit 18 performs the comparison by using, for instance, a demanded torque based on the torque command value, the rotation speed obtained by the rotation speed detection unit 16, and the three-phase motor efficiency map 27.

When the time-division control is performed, the current command generation unit 25 refers to the three-phase motor efficiency map 27, calculates a maximum efficiency torque realizing maximum energy efficiency of the three-phase motor 11 at the present rotation speed by using the three-phase motor efficiency map 27, and generates a d-axis current command and a q-axis current command in accordance with the maximum efficiency torque. Here, note that the torque according to which the current commands are generated (hereinafter referred to as a "command torque") is not limited to the maximum efficiency torque, and may be any torque provided that the torque is larger than the demanded torque. In addition, when the normal control is performed, the current command generation unit 25 generates the d-axis current and the q-axis current in accordance with the demanded torque.

The time-division control unit 26 generates a selection signal for controlling the selector 24 and a conduction specification command signal for controlling the specification signal generation unit 23. Description on the methods for generating the selection signal and the conduction specification command signal is provided in the following.

Figure 12:
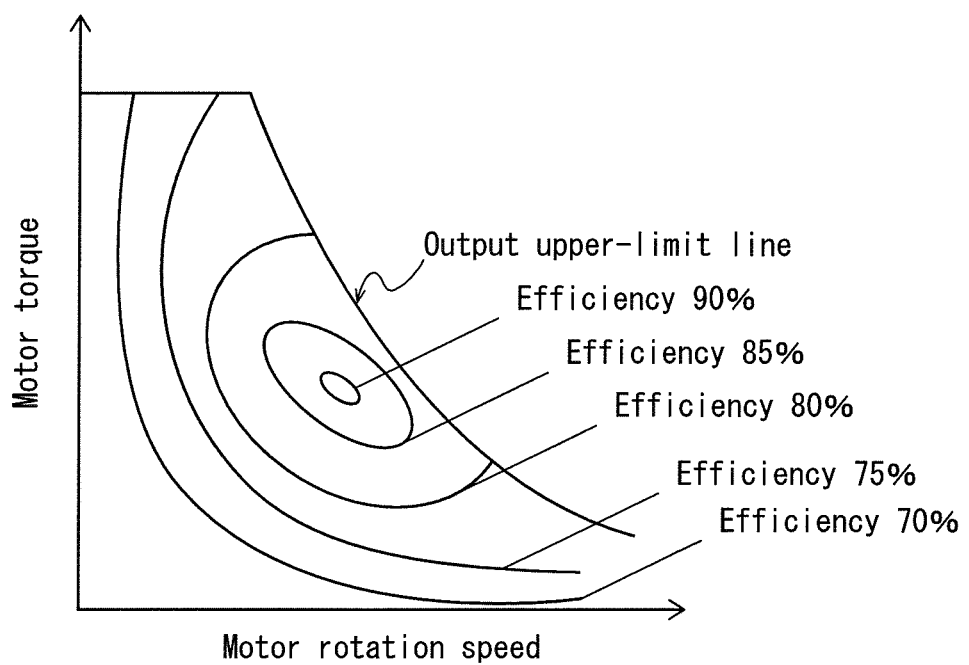
FIG. 12 is a diagram illustrating a correlation between a rotation speed of a motor, torque generated by the motor, and motor efficiency of the motor.
Figure 13:
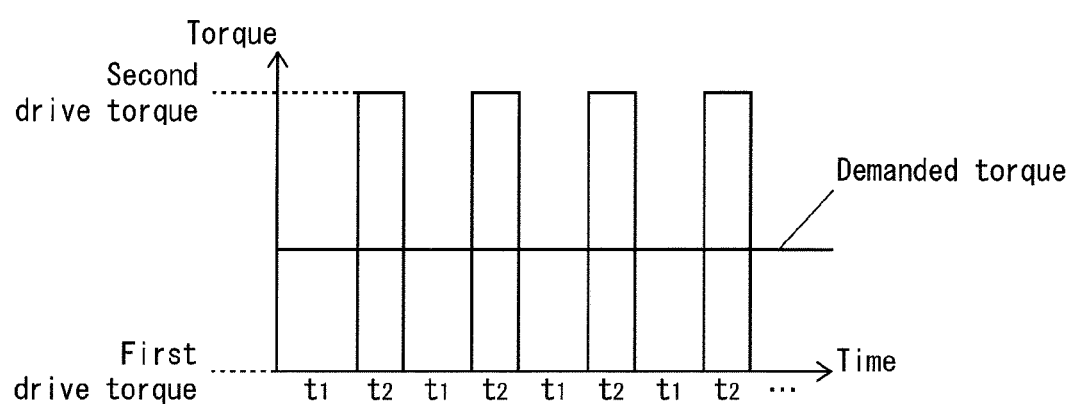
FIG. 13 is a timing chart indicating a chronological change in torque in a conventional motor drive technology disclosed in Patent Literature 1.

The three-phase motor efficiency map 27 is information in the form of a map indicating the correlation between a rotation speed of a motor, torque of the motor, and efficiency of the motor as illustrated in FIG. 12.

The comparison unit 20, for each of the d-axis and the q-axis, compares the corresponding current value output by the current detection unit 15 and the corresponding current command value obtained from the current command generation unit 25, calculates a current error between the current value and the current command value, and outputs the current error to the voltage command unit 19. The current values output by the current detection unit 15 are obtained by sampling performed at the current detection sensors 29 and 30. In specific, the comparison unit 20 outputs each of (i) a current error calculated by comparison of the d-axis current command value and the d-axis current value and (ii) a current error calculated by comparison of the q-axis current command value and the q-axis current value to the voltage command unit 19. Note that the current errors calculated by the comparison unit 20 indicate a difference between current actually being supplied to the three-phase motor 11 and current required for realizing drive of the three-phase motor 11 as desired by a user.

The voltage command unit 19 calculates voltage command values according to the current errors output from the comparison unit 20. In specific, the voltage command unit 19 performs PI control (proportional integration control) on the d-axis current error and the q-axis current error so as to respectively calculate a d-axis voltage command value and a q-axis voltage command value. Further, the voltage command unit 19 performs inverse dq conversion by using the combination of the d-axis voltage command value and the q-axis voltage command value, and the rotation phase angle of the three-phase motor 11, calculates a voltage command value for each of the U-phase, the V-phase, and the W-phase of the three-phase motor 11, and outputs the voltage command values to the PWM signal generation unit 21.

The all-OFF signal generation unit 22 generates, for each of the U-phase, the V-phase, and the W-phase, a signal that puts corresponding switching elements 14 in the non-conduction state (e.g., a signal having low level), and outputs the signals to the selector 24.

The PWM signal generation unit 21 generates, for each of the U-phase, the V-phase, and the W-phase, a signal causing the corresponding switching elements 14 to repeatedly switch between the conduction state and the non-conduction state according to PWM control (e.g., a signal alternating between high level and low level) in accordance with the voltage command values, and outputs the signals to the selector 24.

The specification signal generation unit 23 generates, according to the conduction specification command signal output from the time-division control unit 26, signals that put and keep specific ones of the switching elements 14 in the conduction state while putting and keeping the rest of the switching elements 14 in the non-conduction state (for instance, a signal having high level is generated for each of the specific ones of the switching element 14 while a signal having low level is generated for each of the rest of the switching elements 14), and outputs the signals to the selector 24.

The selector 24, according to the selection signal output from the time-division control unit 26, makes a selection from (i) the signals output from the all-OFF signal generation unit 22, (ii) the signals output from the PWM signal generation unit 21, and (iii) the signals output from the specification signal generation unit 23, and outputs the selected signals to the inverter 12.

The control unit 13 may be implemented, for instance, by using a single processor or by using a combination of multiple processors. In specific, a microcomputer, a DSP (Digital Signal Processor), an FPGA (Field Programmable Gate Array), or a dedicated IC (Integrated Circuit) may be used as a processor for implementing the control unit 13. Note that the control unit 13 may also be implemented without using such processors.

3. Operations

In the following, description is provided on operations of the motor drive system 1 during the time-division control, while referring to waveforms of the currents of the U-phase, the V-phase, and the W-phase of the three-phase motor 11. Note that hereinafter, the currents of the three phases of the three-phase motor 11 may also be collectively referred to as "motor currents".

Figure 3A:
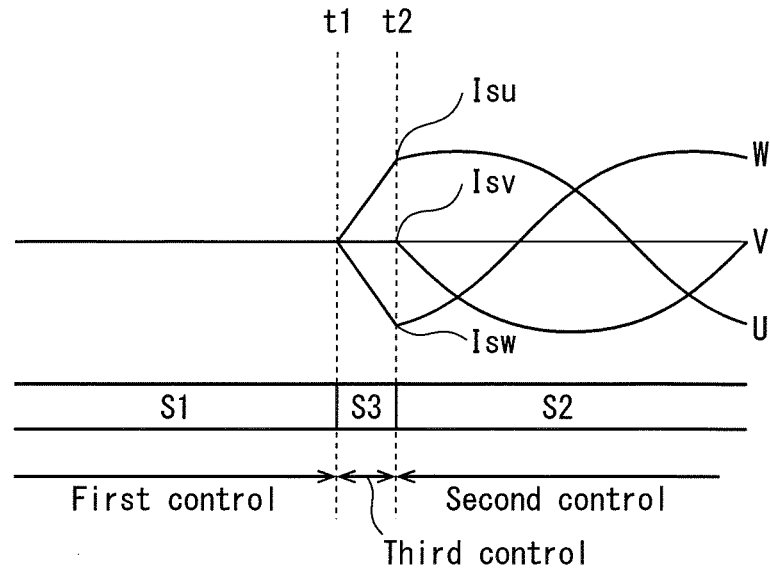
FIG. 3A is an enlarged view of a portion of FIG. 2.
Figure 3B:
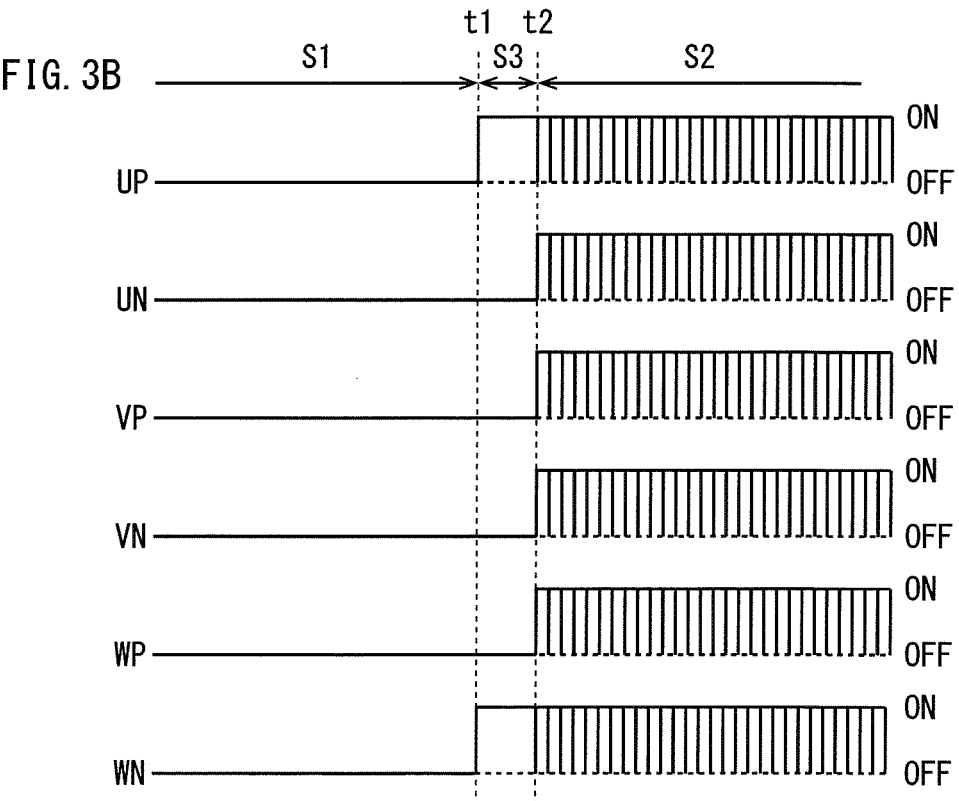
FIG. 3B is a diagram indicating signals output to switching elements for yielding waveforms illustrated in FIG. 3A.
Figure 4:
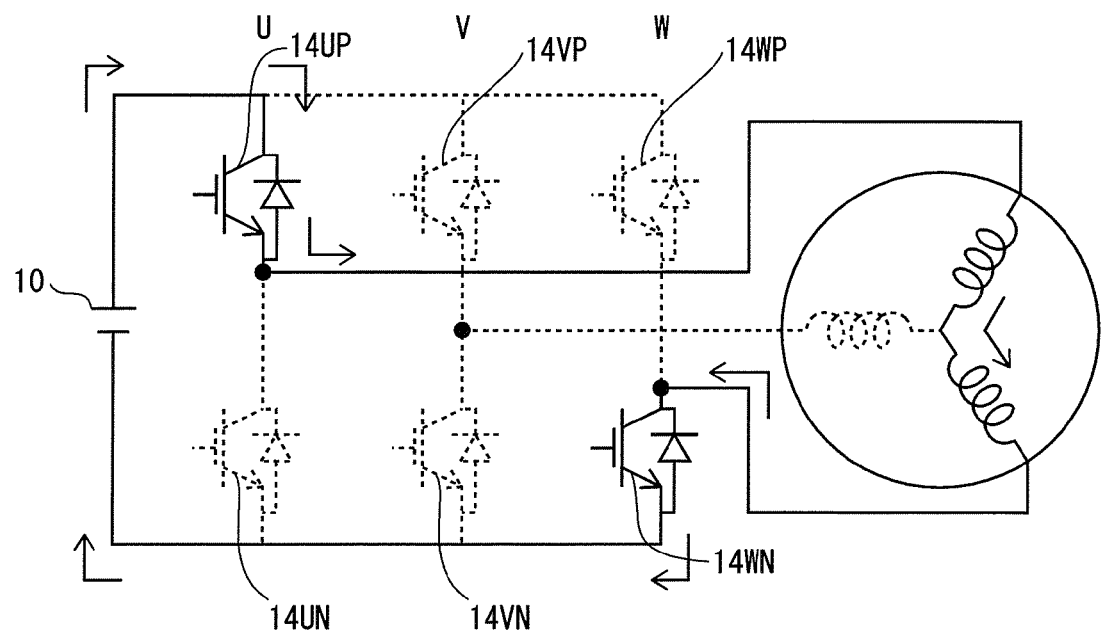
FIG. 4 is a circuit diagram illustrating conduction of an inverter pertaining to embodiment 1.

FIG. 2 is a diagram illustrating one example of the selection signal and the motor currents during the time-division control. FIG. 3A is an enlarged view of a portion of FIG. 2, and FIG. 3B is a diagram indicating signals output to the switching elements for yielding waveforms illustrated in FIG. 3A.

At a given time point, the selection signal is in one of a first state, a second state, and a third state, description on which is provided in the following. When the selection signal is in the first state, referred to as state S1, the selector 24 selects the all-OFF signal generation unit 22. When the selection signal is in the second state, referred to as state S2, the selector 24 selects the PWM signal generation unit 21. When the selection signal is in the third state, referred to as state S3, the selector 24 selects the specification signal generation unit 23.

The conduction specification command signal indicates which ones of the switching elements 14UP, 14VP, 14WP, 14UN, 14VN, and 14WN are to be put in the conduction state when the selection signal is in state S3.

In FIG. 2, the selection signal indicates state S1 until time point t1. As such, during this period, the selector 24 outputs the signals output from the all-OFF signal generation unit 22 to the inverter 12. Accordingly, all of the switching elements 14 are put in the non-conduction state during this period. Due to this, the current of each of the U-phase, the V-phase, and the W-phase is zero during this period. In addition, as illustrated in FIG. 3B, an OFF signal is output to each of the switching elements 14 during this period.

Between time point t1 and time point t2, the selection signal indicates state S3. As such, during this period, the selector 24 outputs the signals output from the specification signal generation unit 23 to the inverter 12. Due to this, specific ones of the switching elements 14 are put and kept in the conduction state during this period while the rest of the switching elements 14 are put and kept in the non-conduction state during this period. The switching elements 14 to be put and kept in the conduction state are specified according to state S11 of the conduction specification command signal. Here, it is presumed that state S11 of the conduction specification command signal indicates that the switching element 14UP of the U-phase upper arm and the switching element 14WN of the W-phase lower arm are to be put and kept in the conduction state while the rest of the switching elements 14 are to be put and kept in the non-conduction state. Due to this, between time point t1 and time point t2, the switching elements 14UP and 14WN are put and kept in the conduction state, whereas the rest of the switching elements 14, namely the switching elements 14UN, 14VP, 14VN, and 14WP, are put and kept in the non-conduction state. As such, between time point t1 and time point t2, a current in a direction entering the three-phase motor 11 flows through the U-phase and a current in a direction exiting the three-phase motor 11 flows through the W-phase. Further, as illustrated in FIG. 3A, the current of the U-phase and the current of the W-phase commonly increase as time elapses from time point t1. In addition, as illustrated in FIG. 3B, an ON signal is output to each of the switching elements 14UP and 14WN during this period, whereas an OFF signal is output to each of the switching elements 14UN, 14VP, 14VN, and 14WP.

Between time point t2 and time point t3, the selection signal indicates state S2. As such, during this period, the selector 24 outputs the signals output from the PWM signal generation unit 21 to the inverter 12. Due to this, the switching elements 14 repeatedly switch between the conduction state and the non-conduction state in accordance with PWM control during this period, and as a result, three-phase alternating current is supplied to the three-phase motor 11 from the inverter 12. In addition, as illustrated in FIG. 3B, an ON signal and an OFF signal are repeatedly output in alternation to each of the switching elements 14 during this period. Here, note that the length of the period between time point t2 and time point t3 is determined according to the method described in the following.

First, the time-division control unit 26 determines a duty ratio according to a ratio between the maximum efficiency torque and the demanded torque. As description has been provided above, the maximum efficiency torque is a torque realizing maximum energy efficiency of the three-phase motor 11. In specific, the duty ratio is determined according to the expression: duty ratio=demanded torque/maximum efficiency torque. In addition, the duty ratio is a ratio determined according to the expression: duty ratio=conduction time/(conduction time+non-conduction time). Here, "conduction time" indicates a period during which the supply of three-phase alternating current to the three-phase motor 11 is performed, and "non-conduction" time indicates a period during which the supply of current to the three-phase motor 11 is suspended. Note that, when a command torque other than the maximum efficiency torque is utilized, the duty ratio is to be determined by using the expression: duty ratio=demanded torque/command torque.

Subsequently, the time-division control unit 26 determines the conduction time according to a total of a length of the conduction time and a length of the non-conduction time, and the duty ratio. The conduction time is determined according to the expression: conduction time=duty ratio×(conduction time+non-conduction time). In the present embodiment, it is presumed that the total length of the conduction time and the non-conduction time is fixed, and therefore is indicated by a fixed value.

Subsequently, the time-division control unit 26 sets the conduction time having been determined as the length of the period between time point t2 and time point t3. By setting the length of the period between time point t2 and time point t3 in such a manner, the average torque generated by the three-phase motor 11 during the period approaches the demanded torque.

Between time point t3 and time point t4, the selection signal indicates state S1. As such, the selector 24 outputs the signals output from the all-OFF signal generation unit 22 to the inverter 12 during this period. Following time point t4, basically the same operations as described above are repeated. In specific, the only difference between the operations described above and the operations following time point t4 is the difference in the switching elements indicated by the conduction specification command signal. For instance, between time point t4 and time point t5, the selection signal indicates state S3. As such, the selector 24 outputs the signals output from the specification signal generation unit 23 to the inverter 12 during this period. The switching elements to be put and kept in the conduction state during this period are specified according to state S12 of the conduction specification command signal.

4. Method for Generating Selection Signal

The time-division control unit 26 internally generates a pulse signal that rises at constant intervals, and determines a timing at which the supply of three-phase alternating current to the three-phase motor 11 is to be commenced by using a timing at which the pulse signal indicates a rise as a barometer for making the determination.

The time-division control unit 26, at a time point preceding a nearest timing at which the pulse signal indicates a rise, estimates the current values of the U-phase, V-phase, and W-phase at the nearest timing at which the pulse signal indicates a rise. The time-division control unit 26 estimates the current values as described in the following.

First, the time-division control unit 26 estimates the rotation phase angle of the three-phase motor 11 at the nearest timing at which the pulse signal indicates a rise by using the present rotation phase angle of the three-phase motor 11, the present rotation speed of the three-phase motor 11, and a time length from the present time point to the nearest timing at which the pulse signal indicates a rise. The present rotation phase angle of the three-phase motor 11 is detected by the phase angle detection unit 17, and the present rotation speed of the three-phase motor 11 is detected by the rotation speed detection unit 16.

Subsequently, the time-division control unit 26 calculates the current values that are to be applied to the U-phase, the V-phase, and the W-phase at the nearest timing at which the pulse signal indicates a rise according to the estimated rotation phase angle. At this point, the current values calculated are specification-based values.

Further, the time-division control unit 26 calculates peak values of the currents that are to be applied to the U-phase, the V-phase, and the W-phase according to a magnitude of the maximum efficiency torque. Subsequently, by multiplying, for instance, the current value (specification-based value) to be applied to the U-phase at the nearest timing at which the pulse signal indicates a rise and the peak value of the current of the U-phase, the time-division control unit 26 calculates the current value of the U-phase at the nearest timing at which the pulse signal indicates a rise. The current values of the V-phase and the W-phase at the nearest timing at which the pulse signal indicates a rise are calculated in a similar manner. As such, the time-division control unit 26 estimates the current values of the U-phase, V-phase, and W-phase at the nearest timing at which the pulse signal indicates a rise.

Subsequently, the time-division control unit 26 sets the estimated current values of the U-phase, the V-phase, and the W-phase, respectively, as target current values Isu, Isv, and Isw.

Following this, the time-division control unit 26 estimates the amount of time required for the currents of the U-phase, the V-phase, and the W-phase to respectively reach the target current values Isu, Isv, and Isw from a timing at which specific ones of the switching elements 14 are put in the conduction state. The amount of time described above is estimated as described in the following.

Figure 5:
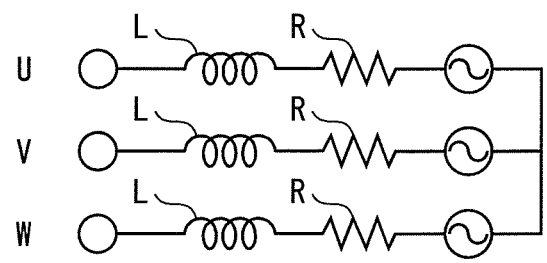
FIG. 5 is an equivalent circuit diagram of a three-phase motor pertaining to embodiment 1.

FIG. 5 is an equivalent circuit diagram of the three-phase motor 11. As illustrated in FIG. 5, an electrical circuit model corresponding to one phase of the three phase motor 11 is expressible as a circuit composed of an inductance L of a coil and a resistance R, which are connected in series.

In the present embodiment, the circuit equation when a direct current voltage Vdc is applied to the three phases of the three-phase motor 11, when presuming that the voltage input from the inverter 12 is sufficiently larger than the voltage generated by the rotation of the three-phase motor 11, or that is, when presuming that the voltage generated by the rotation of the three-phase motor 11 is relatively small and therefore can be left out of account, can be expressed as indicated in [Math. 1]. Further, according to [Math. 1], a chronological change i(t) of currents can be expressed as indicated in [Math. 2]. As such, when setting the timing at which the specific ones of the switching elements 14 are put in the conduction state as t=0, motor currents flow through the three-phase motor 11 as indicated by [Math. 2]. Consequently, by incorporating such current values in [Math. 3], which is obtained by transforming [Math. 2], the amount of time required for the currents of the U-phase, the V-phase, and the W-phase to respectively reach the target current values Isu, Isv, and Isw from the timing at which the specific ones of the switching elements 14 are put in the conduction state can be calculated.

In the above, description has been provided that the voltage generated by the rotation of the three-phase motor 11 is relatively small and therefore can be left out of account in [Math. 1] through [Math. 3]. However, when the voltage generated by the rotation of the three-phase motor 11 is considerably large, and therefore, cannot be left out of account, the inverter input voltage Vdc in the left side of [Math. 1] is to be replaced with (inverter input voltage—voltage generated by motor).

$$V_{dc}(t) = 2Ri(t) + 2L\frac{di}{dt} \quad \text{[Math. 1]}$$

$$i(t) = \frac{V_{dc}}{2R}(1 - e^{-\frac{R}{L}t}) \quad \text{[Math. 2]}$$

-continued $$t = -\frac{L}{R}\text{Log}_e\left(1 - \frac{2Ri}{V_{dc}}\right) \quad \text{[Math. 3]}$$

The time-division control unit 26 sets, as the timing at which the specific ones of the switching elements 14 are to be put in the conduction state, a timing preceding the nearest timing at which the pulse signal indicates a rise by the estimated amount of time. That is, the time-division control unit 26 determines the above-described timing as the timing at which the selection signal is to be switched from state S1 to state S3.

Following this, when the selection signal switches to state S3, the time-division control unit 26 detects currents of the U-phase, the V-phase, and the W-phase, and sets, as the timing at which the supply of alternating current to the three phases of the three-phase motor 11 is to be commenced, a timing at which the detected current values of the U-phase, the V-phase, and the W-phase respectively reach the target current values Isu, Isv, and Isw. That is, the time-division control unit 26 determines the above-described timing as the timing at which the selection signal is to be switched from state S3 to state S2. Here, when the above-described estimation of the amount of time in accordance with [Math. 3] is performed accurately, the nearest timing at which the pulse signal indicates a rise and the timing at which the supply of three-phase alternating current to the three-phase motor 11 is commenced coincide.

When the selection signal switches to state S2, the time-division control unit 26 sets, as the timing at which the supply of current to the three-phase motor 11 is to be suspended, a timing following the elapse of the conduction time determined in accordance with the duty ratio as described above. That is, the time-division control unit 26 determines the above-described timing as the timing at which the selection signal is to be switched from state S2 to state S1.

The generation of the selection signal is performed by the above-described processing being executed.

5. Method for Generating Conduction Specification Command Signal

As description has been provided above, the time-division control unit 26 internally generates a pulse signal that rises at constant intervals. The time-division control unit 26, at a time point preceding the nearest timing at which the pulse signal indicates a rise, estimates the magnitudes and directions of the currents of the U-phase, V-phase, and W-phase at the nearest timing at which the pulse signal indicates a rise. To estimate the magnitudes and the directions of the currents, the time-division control unit 26 estimates the rotation phase angle of the three-phase motor 11 at the nearest timing at which the pulse signal indicates a rise, and further, by using the rotation phase angle of the three-phase motor 11 so estimated, calculates the current values to be applied to the U-phase, the V-phase, and the W-phase. Such processing is similar to the processing executed in the generation of the selection signal. Each of the current values calculated in the above-described manner is either a positive number or a negative number. The absolute value of each current value indicates the magnitude of the current, and the direction of the current is indicated by whether the current value is a positive value or a negative value.

The time-division control unit 26 configures the conduction specification command signal such that a switching element of the upper arm corresponding to a phase of the three-phase motor 11 through which current in a direction entering the three-phase motor 11 is to flow upon commencement of the supply of three-phase alternating current to the three-phase motor 11 is put and kept in the conduction state until the commencement of the supply of three-phase alternating current to the three-phase motor 11. Similarly, the time-division control unit 26 configures the conduction specification command signal such that a switching element of the lower arm corresponding to a phase of the three-phase motor 11 through which current in a direction exiting the three-phase motor 11 is to flow upon commencement of the supply of three-phase alternating current to the three-phase motor 11 is put and kept in the conduction state until commencement of the supply of three-phase alternating current to the three-phase motor 11.

Figure 6A:
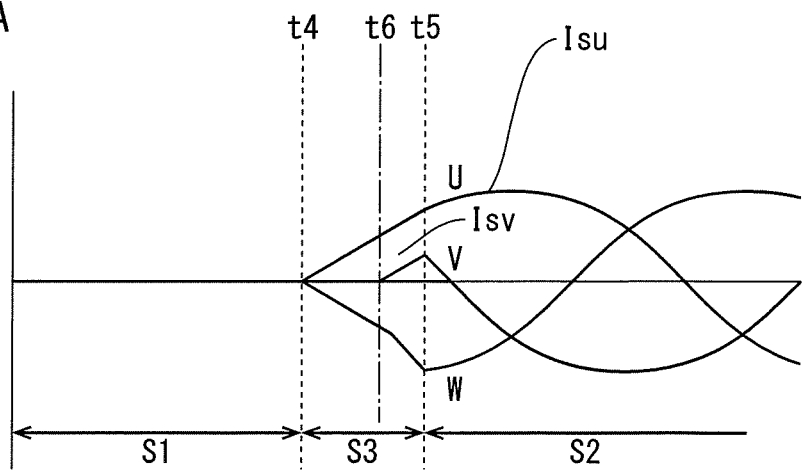
FIG. 6A is an enlarged view of another portion of FIG. 2.
Figure 6B:
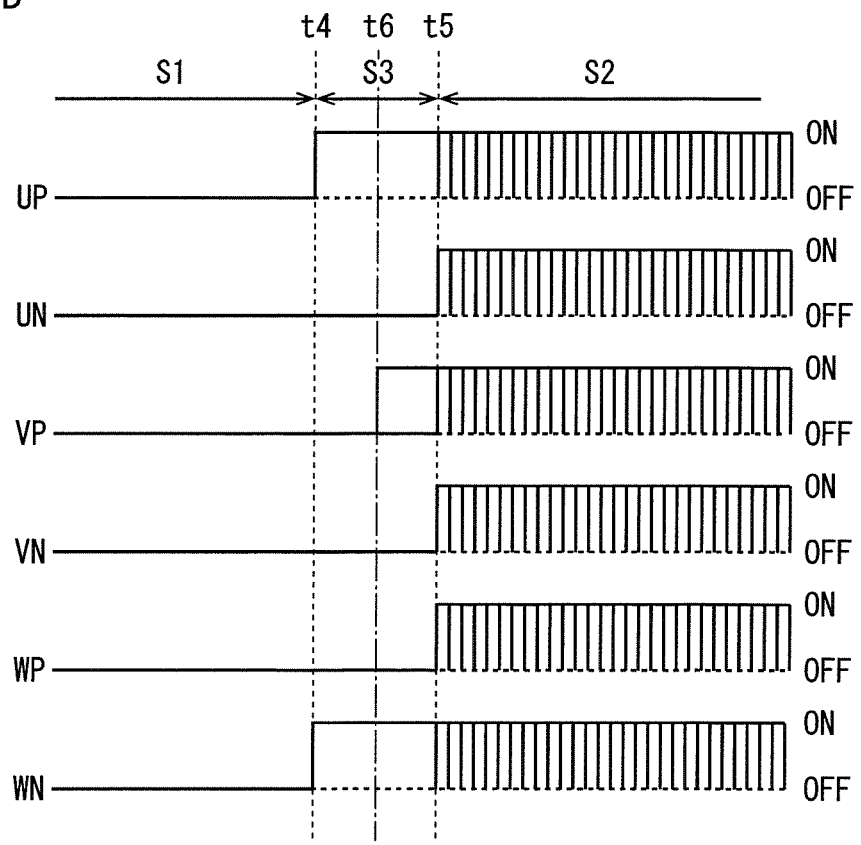
FIG. 6B is a diagram indicating signals output to the switching elements for yielding the waveforms illustrated in FIG. 6A.
Figure 7:
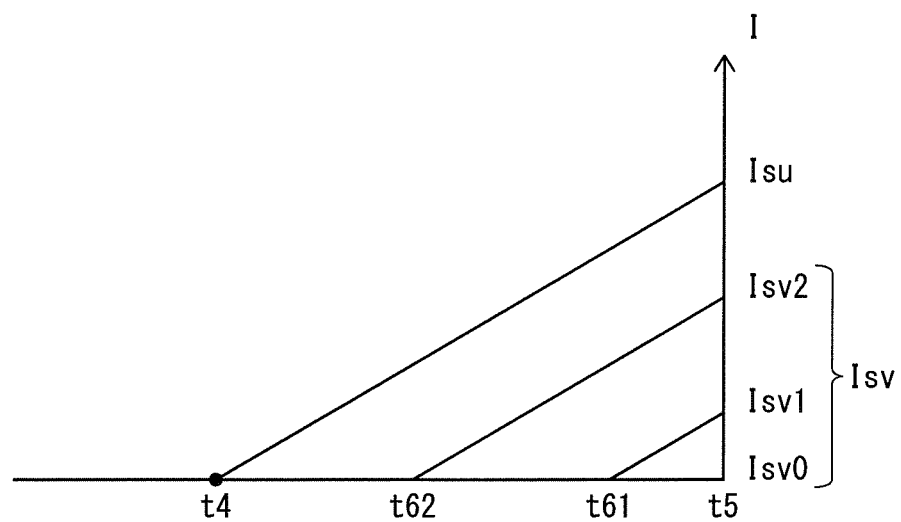
FIG. 7 is a waveform diagram indicating a correlation between target current values of U and V phases and a chronological change.

For instance, in the example illustrated in FIG. 3A, the target current value Isu of the U-phase at time point t2 is a positive value. Hence, the current that is to flow through the U-phase at time point t2 is a current flowing in a direction entering the three-phase motor 11. Similarly, in the example illustrated in FIG. 3A, the target current value Isw of the W-phase at time point t2 is a negative value. Hence, the current that is to flow through the W-phase at time point t2 is a current flowing in a direction exiting the three-phase motor 11. As such, the time-division control unit 26 configures state S11 of the conduction specification command signal between time point t1 and time point t2 such that the switching element 14UP of the U-phase upper arm and the switching element 14WN of the W-phase lower arm are put and kept in the conduction state between time point t1 and time point t2. Note that, although the target current value Isv of the V-phase at timing t2 is zero in the example illustrated in FIG. 3A, this situation is brought about by mere coincidence, and there may also be cases where none of the current values of the three phases of the three-phase motor 11 is zero at the timing at which the supply of three-phase alternating current to the three-phase motor 11 is to be commenced. For instance, at time point t5 illustrated in FIG. 2, none of the target current values of the U-phase, the V-phase, and the W-phase is zero. In such cases where current is to flow through two phases among the U-phase, the V-phase, and the W-phase of the three-phase motor 11 in the same direction at the timing at which the supply of alternating current to the phases of the three-phase motor 11 is to be commenced, a switching element 14 corresponding to one phase, among the two phases, through which relatively large current is to flow is put and kept in the conduction state, and then, following a predetermined interval, a switching element 14 corresponding to the other phase, among the two phases, through which relatively small current is to flow is put and kept in the conduction state, as illustrated in FIG. 6A. FIG. 6B is a diagram illustrating signals output to the switching elements 14 for yielding the waveforms illustrated in FIG. 6A. As illustrated in FIG. 6B, an OFF signal is output to each of the switching elements 14 until time point t4. Subsequently, between time point t4 and time point t6, an ON signal is output to each of the switching elements 14UP and 14WN, whereas an OFF signal is output to each of the switching elements 14UN, 14VP, 14VN, and 14WP. Following this, between time point t6 and time point t5, an ON signal is output to each of the switching elements 14UP, 14VP, and 14WN, whereas an OFF signal is output to each of the switching elements 14UN, 14VN, and 14WP. Further, following time point t5, an ON signal and an OFF signal are repeatedly output in alternation to each of the switching elements 14. In this example, the switching element 14UP of the U-phase upper arm and the switching element 14WN of the W-phase lower arm are put in the conduction state at time point t4, and subsequently, the switching element 14VP of the V-phase upper arm is put in the conduction state at time point t6. The difference in the timing at which the switching elements 14UP and 14WN are put in the conduction state and the timing at which the switching element 14 VP is put in the conduction state reflects the difference in the magnitudes of the target current values Isu, Isv, and Isw. That is, since the inductance L of the coil and the resistance R of the three-phase motor 11 are substantially the same for each of the U-phase, the V-phase, and the W-phase, the rate of the change of a current flowing through each of the U-phase, the V-phase, and the W-phase when a corresponding one of the switching elements 14 is put in the conduction state is substantially the same for the U-phase, the V-phase, and the W-phase. Due to this, the amount of time that is required for the current values of the U-phase, the V-phase, and the W-phase to respectively reach the target current values from the timing at which corresponding ones of the switching elements 14 are put in the conduction state increases for larger target current values. For instance, as illustrated in FIG. 7, so as to ensure that the current value of the V-phase reaches a target current value Isv1 at time point t5, the corresponding switching element 14 needs to be put in the conduction state from time point t61. On the other hand, so as to ensure that the current value of the V-phase reaches a larger target current value Isv2 at time point t5, the corresponding switching element 14 needs to be put in the conduction state from an earlier time point t62.

Figures 8A, 8B:
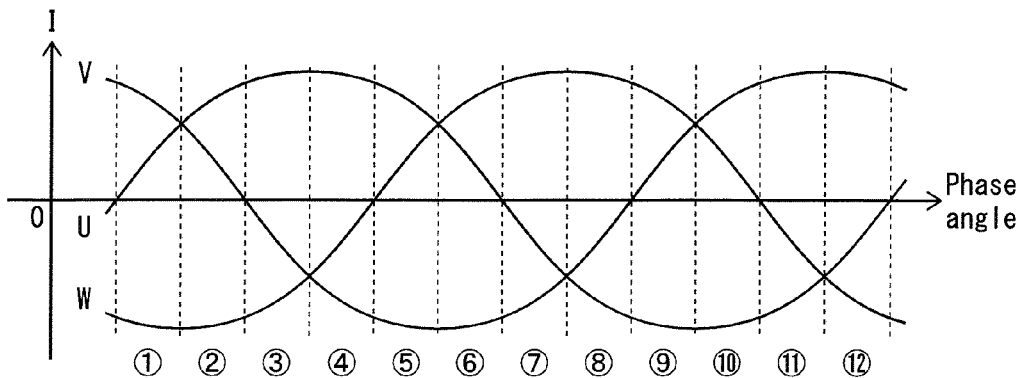
FIG. 8A is a waveform diagram indicating current waveforms within sections obtained by dividing a rotation phase angle of a motor into 30° sections.
FIG. 8B is a diagram indicating a correlation between the sections and switching elements put in a conduction state.

FIGS. 8A and 8B are diagrams illustrating sections obtained by dividing the rotation phase angle of the three-phase motor 11 into 30° sections and switching elements 14 put in the conduction state within each of the sections. The sections 1 through 12 in FIG. 8A correspond to the sections 1 through 12 in FIG. 8B. Section 1 corresponds to a rotation phase angle range of equal to or larger than 0° and smaller than 30°, section 2 corresponds to a rotation phase angle range of equal to or larger than 30° and smaller than 60°, and so on. Further, in FIG. 8B, "ON" indicates switching elements 14 to be put in the conduction state, "adjusted ON" indicates switching elements 14 to be put in the conduction state following the elapse of the predetermined interval after switching elements 14 corresponding to "ON" are put in the conduction state. For instance, when the timing at which the supply of three-phase alternating current to the three-phase motor 11 is to be commenced is included in section 1, the switching element 14VP of the V-phase upper arm and the switching element 14WN of the W-phase lower arm are to be put into the conduction state first, and then, following the elapse of the predetermined interval, the switching element 14UP of the U-phase upper arm is to be switched from the non-conduction state to the conduction state. Here, note that the rotation phase angle of the three-phase motor 11 at time point t2 illustrated in FIG. 2 is 60°, and therefore, is included in section 3. At time points such as time point 2, where the current of a phase corresponding to a switching element 14 indicated as "adjusted ON" is 0 A (ampere), the switching element 14 is in the non-conduction state. In addition, the phase angle at time point t5 illustrated in FIG. 2 is around 50°, and therefore, is included in section 2.

In addition, at a time point corresponding to a boundary between two sections, when a state of a given switching element 14 is "adjusted ON" in one section and the state of the given switching element 14 is "ON" in the other section, the switching element is in the conduction state at the time point corresponding to the boundary between the two sections. For instance, at a time point corresponding to the boundary between section 1 and section 2, the switching element 14WN is in the conduction state, and in addition, both of the switching elements 14UP and 14VP are in the conduction state.

In contrast, at a time point corresponding to a boundary between two sections, when a state of a given switching element is "adjusted ON" in one section and the state of the given switching element is "OFF" in the other section, the switching element is in the non-conduction state at the time point corresponding to the boundary between the two sections. For instance, at the time point corresponding to the boundary between section 2 and section 3, the switching elements 14UN and 14WP are in the non-conduction state, and in addition, the switching elements 14VP and 14VN are in the non-conduction state.

6. Effects

As description has been provided above, the control unit 13 selectively switches between a first control, a second control, and a third control. The first control is control of putting all of the switching elements 14 in the non-conduction state. The second control is control of causing each of the switching elements 14 to repeatedly switch between the conduction state and the non-conduction state in accordance with PWM control so as to cause the inverter 12 to perform the supply of three-phase alternating current to the three-phase motor 11. The third control is control of putting and keeping a switching element 14 of the upper arm corresponding to a phase of the three-phase motor 11 through which current is to flow in a direction entering the three-phase motor 11 upon commencement of the supply of three-phase alternating current to the three-phase motor 11 in the conduction state until commencement of the supply of three-phase alternating current to the three-phase motor 11 and putting and keeping a switching element 14 of the lower arm corresponding to a phase of the three-phase motor 11 through which current is to flow in a direction exiting the three-phase motor 11 upon commencement of the supply of three-phase alternating current to the three-phase motor 11 in the conduction state until commencement of the supply of three-phase alternating current to the three-phase motor 11. Further, when switching from the first control, which corresponds to a state of the three-phase motor 11 where generation of torque is not performed, to the second control, which corresponds to a state of the three-phase motor 11 where generation of torque is performed, the control unit 13 switches from the first control to the third control, and then to the second control. By switching between controls being performed in such an order, the amount of time required for the transition from the suspension of the supply of current to the three-phase motor 11 to the commencement of the supply of three-phase alternating current to the three-phase motor 11 is reduced. In the following, detailed explanation is provided of advantageous effects brought about by the present embodiment, with reference to FIG. 9.

Figure 9A:
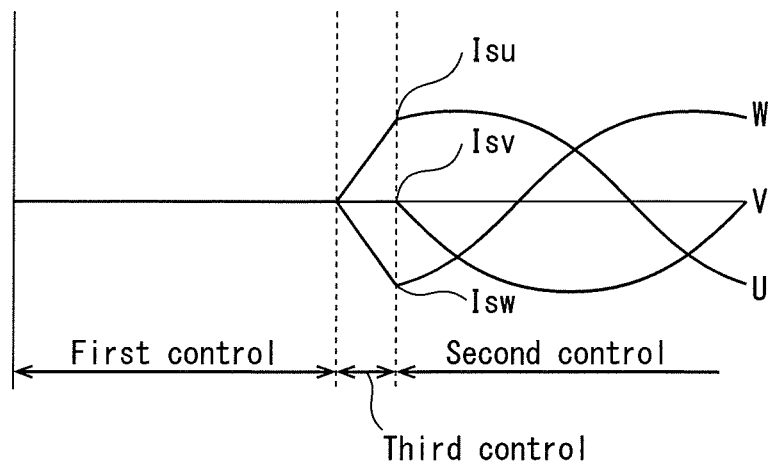
FIG. 9A is a waveform diagram illustrating a chronological change in motor current waveforms in the present embodiment.
Figure 9B:
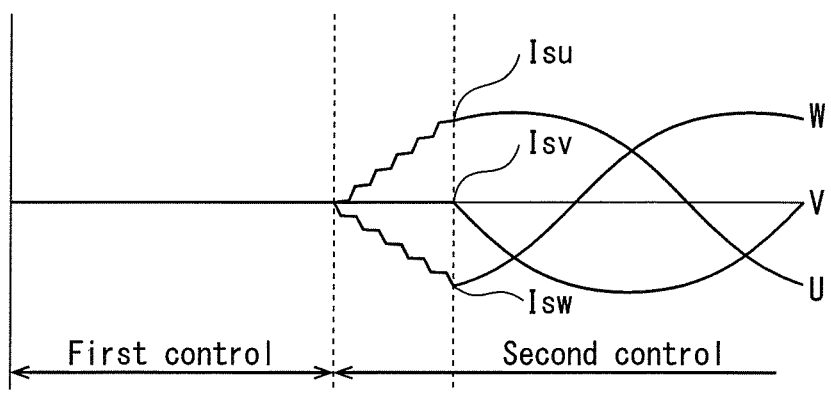
FIG. 9B is a waveform diagram illustrating a chronological change in motor current waveforms in a comparative example.

FIG. 9A is a waveform diagram illustrating a chronological change in the motor current waveforms in the present embodiment, and FIG. 9B is a waveform diagram illustrating a chronological change in motor current waveforms in a comparative example. Here, the comparative example is an example where switching is performed directly from the first control to the second control when switching is performed from the state of the three-phase motor 11 where the generation of torque is not performed to the state of the three-phase motor 11 where the generation of torque is performed. Further, in the comparative example, switching elements corresponding to all three phases of a three phase motor are caused to perform switching operations in accordance with PWM control, as illustrated in FIG. 9B. That is, the switching elements corresponding to the U-phase, the V-phase, and the W-phase are repeatedly switched between the conduction state and the non-conduction state until the current values of the U-phase, the V-phase, and the W-phase respectively reach the target current values Isu, Isv, and Isw. Note that in this example, since the duty ratio of the switching element corresponding to the V-phase is ½, the apparent current value of the V-phase is zero.

In contrast, according to the present embodiment, during the period of transition from the first control, which corresponds to the state of the three-phase motor 11 where the generation of torque is not performed, to the second control, which corresponds to the state of the three-phase motor 11 where the generation of torque is performed, the third control of putting and keeping the switching element 14UP of the U-phase upper arm in the conduction state and putting and keeping the switching element 14WN of the W-phase lower arm in the conduction state is performed, as illustrated in FIG. 9A.

In the comparative example where PWM control of the switching elements is performed, there are periods during which the switching element 14UP of the U-phase upper arm and the switching element 14WN of the W-phase lower arm are in the non-conduction state. In contrast, according to the present embodiment where the third control is performed, there are no periods during which the switching element 14UP of the U-phase upper arm and the switching element 14WN of the W-phase lower arm are in the non-conduction state. Hence, the amount of time required for the transition from the first control corresponding to the state of the three-phase motor 11 where generation of torque is not performed to the second control corresponding to the state of the three-phase motor 11 where generation of torque is performed is reduced. As such, the present embodiment realizes reduction in energy loss by shortening the period of transition from the first control to the second control, during which the three-phase motor 11 is driven in a state of relatively low motor efficiency. Accordingly, the present embodiment provides a motor drive system that reduces energy loss during the period for transition from the first control corresponding to the state of the three-phase motor 11 where generation of torque is not performed to the second control corresponding to the state of the three-phase motor 11 where generation of torque is performed.

In addition, by reducing the amount of time required for the transition, a period during which the motor generates torque corresponding to maximum energy efficiency is extended, and in addition, a period, preceding the commencement of the supply of current to the motor, during which the generation of torque by the motor is not performed can be extended. As such, the present embodiment provides a motor drive system that realizes a further reduction in energy loss.

Modifications

1. Example of Modification of Timing for Switching from Third Control to Second Control In the embodiment, when the selection signal switches to state S3, the time-division control unit 26 detects the current values of the U-phase, the V-phase, and the W-phase, and sets, as the timing at which the supply of three-phase alternating current to the three-phase motor 11 is to be commenced, a timing at which the detected current values of the U-phase, the V-phase, and the W-phase respectively reach the target current values Isu, Isv, and Isw. However, the present invention is not limited to such an example where actual measurement of current values is performed. That is, a timing following the elapse of an interval determined according to [Math.

3] after the selection signal switches to state S3 may be set as the timing for commencing the supply of alternating current to the three phases of the three-phase motor 11.

When this modification is applied, the input of the motor current values to the time-division torque control unit 18 from the current detection unit 15 becomes unnecessary. As a result, a motor drive system that has a simplified structure can be realized.

2. Example of Modification of Switching Element "Adjusted ON" Control in Third Control In the embodiment, when currents of two phases among the U-phase, the V-phase, and the W-phase flow in the same direction during the third control, a switching element of the upper arm corresponding to one phase, among the two phases, having a relatively small current value is switched to the conduction state from the non-conduction state after elapse of the predetermined interval. However, the control performed in such a case is not limited to the above-described control, and a different type of control may be performed instead. In the following, explanation is provided of this modification.

Figure 10A:
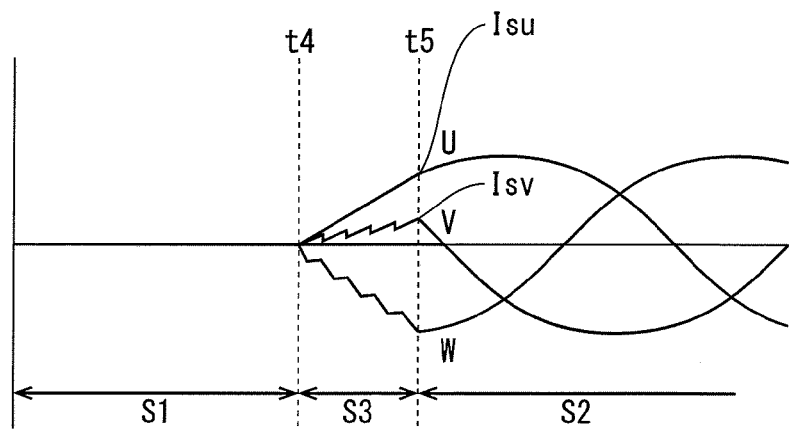
FIG. 10A is a waveform diagram indicating current waveforms of three phases pertaining to a modification.
Figure 10B:
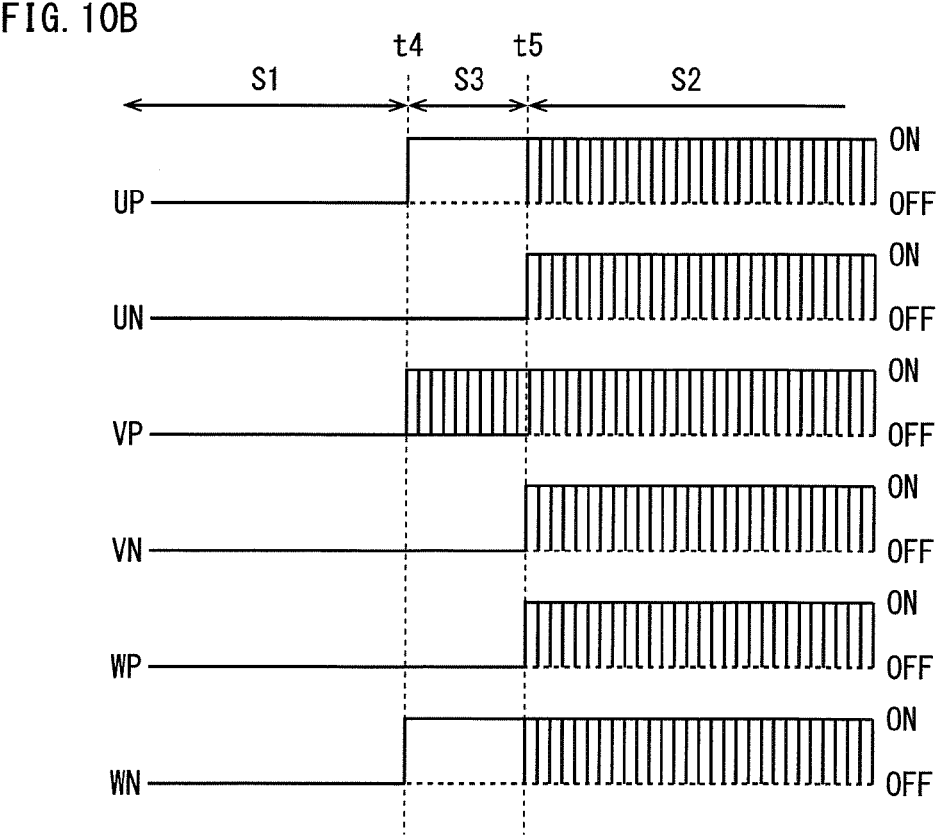
FIG. 10B is a diagram indicating signals output to the switching elements for yielding the waveforms illustrated in FIG. 10A.
Figure 11:
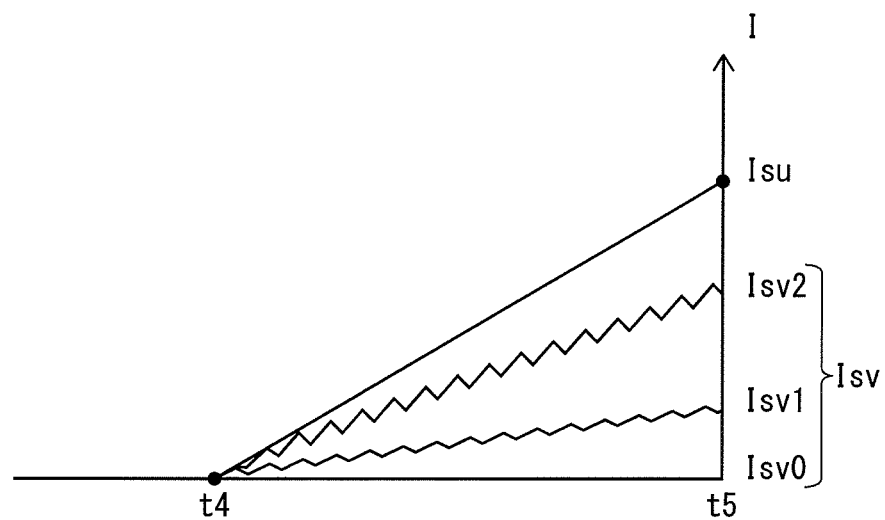
FIG. 11 is a waveform diagram indicating a correlation between the target current values of the U and V phases and a chronological change.

FIG. 10A is a waveform diagram indicating the current waveforms of the three phases of the three-phase motor 11, and FIG. 10B is a diagram indicating signals output to the switching elements for yielding the current waveforms illustrated in FIG. 10A. FIG. 11 is a diagram indicating a correlation between the target current value of the U-phase and an inclination of the current of the U-phase. As illustrated in FIG. 10A, while the selection signal indicates state S3, control may be performed such that the switching element 14VP of the V-phase upper arm is caused to repeatedly switch between the conduction state and the non-conduction state at the same time as the switching element 14UP of the U-phase upper arm and the switching element 14WN of the W-phase lower arm are put and kept in the conduction state. Further, when the target current values of the V-phase and the U-phase are respectively indicated by Isv and Isu, the duty ratio of the V-phase while the selection signal indicates S3 is Isv/Isu. Therefore, control may be performed of causing the switching element 14VP of the V-phase upper arm to repeatedly switch between the conduction state and the non-conduction state for only a period Isv/Isu during the period from time point t4 to time point t5. In specific, as illustrated in FIG. 10B, an OFF signal is output to each of the switching elements 14 until time point t4. Following this, between time point t4 and time point t5, an ON signal is output to each of the switching elements 14UP and 14WN, an OFF signal is output to each of the switching elements 14UN, 14VN, and 14WP, and further, an ON signal and an OFF signal are repeatedly output in alternation to the switching element 14VP such that the switching element 14VP is in the ON state for the period Isv/Isu. Further, following time point t5, an ON signal and an OFF signal are repeatedly output in alternation to each of the switching elements 14. As illustrated in FIG. 11, the switching element 14VP of the V-phase upper arm is caused to repeatedly switch between the ON state and the OFF state in alternation between the period from time point t4 to time point t5 so that the current of the V-phase reaches the target current value Isv at time point t5.

3. Example of Modification of Timing for Switching from Second Control to First Control In the embodiment, the timing at which control is switched from the second control to the first control corresponds to the timing at which a sine wave current is switched from ON to OFF. In the following, explanation is provided of a modification concerning this timing.

When switching from the second control to the first control, the time-division torque control unit 18 may detect, according to the signals input from the current detection unit 15, a timing at which a current flowing through one of the three phases of the three-phase motor 11 equals substantially 0 A. Further, at this timing, the time-division control unit 26 may transmit a signal to the selector 24, and the selector 24 may output the signals from the all-OFF signal generation unit 22 to the switching elements 14. Due to this, all of the switching elements 14 of the inverter 12 are put in the non-conduction state.

As description is provided above, by switching from the second control to the first control at a timing at which a current flowing through one of the three phases of the three-phase motor 11 equals substantially 0 A, circuit loss is reduced during a period from a time point where switching to the first control is performed to a time point where the currents flowing through all three phases of the three-phase motor 11 equal 0 A. Note that the circuit loss as mentioned above occurs as a result of voltages of the freewheeling diodes dropping. During the period from the time point where switching to the first control is performed to the time point where the currents flowing through all three phases of the three-phase motor 11 equal 0 A, current flowing through the three-phase motor 11 is returned to the power source 10 via the freewheeling diodes of the inverter 12. For instance, when switching to the first control is performed at a time point where the current flowing through the U-phase is substantially 0 A, circuit loss takes place at two locations, namely, at the V-phase upper and lower arms or at the V-phase upper and lower arms. As such, by performing switching to a non-conduction operation, or that is, by switching from the second control to the first control at the timing at which a current flowing through one of the three phases of the three-phase motor 11 equals substantially 0 A, circuit loss at the switching elements is reduced compared to a case where circuit loss occurs at three locations. As such, the present invention provides a motor drive system that has an even higher level of energy efficiency.

4. Example of Modification of Timing for Switching from Third Control to Second Control In the embodiment, the timing at which switching from the third control to the second control is performed is put into substantial correspondence with the nearest timing at which the pulse signal generated internally by the time-division control unit 26 indicates a rise. As such, the correlation between the timing at which switching from the third control to the second control is performed and the rotation phase angle of the three-phase motor 11 is not fixed. However, the timing at which switching from the third control to the second control is performed is not limited to the above-described timing, and a fixed correlation can be established between the timing at which switching from the third control to the second control is performed and the rotation phase angle of the three-phase motor 11. For instance, the timing at which switching from the third control to the second control is performed may be set so as to coincide with the timing at which the rotation phase angle of the three-phase motor 11 equals $(\alpha+(60°\times N))$. Here, $\alpha$ is a fixed value satisfying $0°\leq\alpha\leq60°$, and N is an integer selected from a range of $0\leq N\leq 5$. The selection of N is made each time the timing arrives at which the supply of the three-phase alternating current to the three-phase motor 11 is to be commenced. Note that every time the rotation phase angle of the three-phase motor 11 changes by 60°, the three-phase motor 11 is in the same condition where the magnitudes of the respective currents flowing through the three phases of the three-phase motor 11 indicate the same level. By fixing the timing at which switching from the third control to the second control is performed to a timing where the three-phase motor 11 is in the condition as described above, the necessity of performing calculations utilizing [Math. 3] every time is eliminated. As such, the processing load exerted on the time-division control unit 26 is reduced.

Note that, in order to realize the above-described modification, when, for instance, the timing at which the pulse signal generated internally by the time-division control unit 26 indicates a rise coincides with the timing at which the rotation phase angle of the three-phase motor 11 equals ($\alpha+(60°\times N)$), the timing at which the pulse signal indicates a rise may be set as the timing for switching from the third control to the second control. In addition, if the timing at which the pulse signal indicates a rise does not coincide with the timing at which the rotation phase angle of the three-phase motor 11 equals ($\alpha+(60°\times N)$), a timing, preceding the timing at which the pulse signal indicates a rise, at which the rotation phase angle equals ($\alpha+(60°\times N)$) or a timing, succeeding the timing at which the pulse signal indicates a rise, at which the rotation phase angle equals ($\alpha+(60°\times N)$) may be set as the timing for switching from the third control to the second control. In such a case, a selection may be made among the two timings preceding and succeeding the timing at which the pulse signal indicates a rise as the timing for switching from the third control to the second control in accordance with the relationship in magnitude of time average torque that is actually generated by the three-phase motor 11 and target torque that is to be generated by the three-phase motor 11. In specific, when the time average torque is larger than the target torque, the timing, succeeding the timing at which the pulse signal indicates a rise, at which the rotation phase angle equals ($\alpha+(60°\times N)$) is to be set as the timing for switching from the third control to the second control, whereas, when the target torque is larger than the time average torque, the timing, preceding the timing at which the pulse signal indicates a rise, at which the rotation phase angle equals ($\alpha+(60°\times N)$) is to be set as the timing for switching from the third control to the second control. By performing the setting of the timing for switching from the third control to the second control in a manner as described above, the difference between the time average torque and the target torque can be suppressed.

The motor drive system pertaining to the present invention has a wide range of possible applications including, for instance, inverter control of a compressor of an air conditioning unit, inverter control of a refrigerator, inverter control of an air to water heat pump, inverter control of an industrial servo amp, and inverter control of electric and hybrid vehicles.

REFERENCE SIGNS LIST

11 three-phase motor
12 inverter
13 control unit
14 switching element
21 PWM signal generation unit
22 all-OFF signal generation unit
23 specification signal generation unit
24 selector
26 time-division control unit

The invention claimed is:

1. A motor drive system comprising:
an inverter that supplies power to a three-phase motor by supplying alternating current to three phases of the three-phase motor, the inverter including at least three upper arms and at least three lower arms, each of the at least three upper arms and each of the at least three lower arms including a switching element and a freewheeling diode that are connected in parallel; and
a control unit that performs control of the switching elements included in the inverter by switching between a first control, a second control, and a third control, wherein
the first control puts the switching elements in a non-conduction state and thereby causes the inverter to stop the supply of alternating current to the three phases,
the second control causes the switching elements to repeatedly switch between a conduction state and the non-conduction state and thereby causes the inverter to perform the supply of alternating current to the three phases, and
the third control places and maintains a switching element of an upper arm, among the at least three upper arms, and a switching element of a lower arm, among the at least three lower arms, in the conduction state from commencement of the third control until commencement of the supply of alternating current to the three phases, the switching element of the upper arm corresponding to a phase, among the three phases, through which alternating current is to flow in a first direction entering the three-phase motor upon commencement of the supply of alternating current to the three phases, the switching element of the lower arm corresponding to a phase, among the three phases, through which alternating current is to flow in a second direction exiting the three-phase motor upon commencement of the supply of alternating current to the three phases,
the control unit controls the switching elements included in the inverter by performing an intermittent control of (i) repeatedly performing a set of controls that includes the first control, the third control, and the second control performed in the stated order, and (ii) ensuring that, in every repetition of the set of controls, an average of a torque output by the three-phase motor during the period equals a demanded torque, and
in every repetition of the set of controls, the control unit switches from the first control to the third control, and then to the second control, thereby causing the inverter to stop the supply of alternating current to the three phases and then to commence the supply of alternating current to the three phases.

2. The motor drive system of claim 1, wherein
in a case where alternating current is to flow through two phases, among the three phases, in one direction among the first direction and the second direction upon commencement of the supply of alternating current to the three phases,
the control unit performs the third control such that first, a first switching element corresponding to one phase, among the two phases, through which relatively large alternating current is to flow upon commencement of the supply of alternating current to the three phases is placed and maintained in the conduction state, and then, following a predetermined interval, a second switching element corresponding to the other phase, among the two phases, through which relatively small alternating current is to flow upon commencement of the supply of alternating current to the three phases is put in the conduction state.

3. The motor drive system of claim 1, wherein
in a case where alternating current is to flow through two phases, among the three phases, in one direction among the first direction and the second direction upon commencement of the supply of alternating current to the three phases,
the control unit performs the third control such that a first switching element corresponding to one phase, among the two phases, through which relatively large alternating current is to flow upon commencement of the supply of alternating current to the three phases is placed and maintained in the conduction state, and a second switching element corresponding to the other phase, among the two phases, through which relatively small alternating current is to flow upon commencement of the supply of alternating current to the three phases is caused to repeatedly switch between the conduction state and the non-conduction state.

4. The motor drive system of claim 1, wherein
the control unit causes the inverter to commence the supply of alternating current to the three phases at a timing at which a phase angle of the three-phase motor equals ($\alpha$+(60°×N)), where $\alpha$ is a fixed value satisfying 0°≤$\alpha$<60°, and N is an integer selected from a range of 0≤N≤5.

5. The motor drive system of claim 4, wherein
the control unit obtains a pulse signal usable in determining a timing for causing the inverter to commence the supply of alternating current to the three phases, and
when the timing at which the phase angle equals ($\alpha$+(60°×N)) does not coincide with a timing indicated by the pulse signal, the control unit determines, as the timing for causing the inverter to commence the supply of alternating current to the three phases, a timing, preceding the timing indicated by the pulse signal, at which the phase angle equals ($\alpha$+(60°×N)) or a timing, succeeding the timing indicated by the pulse signal, at which the phase angle equals (a$\alpha$30 (60°×N)).

6. The motor drive system of claim 1, wherein
at a timing at which alternating current flowing through one of the three phases equals zero, the control unit switches from the second control to the first control.

7. A method for driving an inverter that supplies power to a three-phase motor by supplying alternating current to three phases of the three-phase motor, the inverter including at least three upper arms and at least three lower arms, each of the at least three upper arms and each of the at least three lower arms including a switching element and a freewheeling diode that are connected in parallel, the method comprising:
performing control of the switching elements included in the inverter by switching between a first control, a transition control and an alternating current supply control, wherein
the first control puts the switching elements in a non-conduction state and thereby causes the inverter to stop the supply of alternating current to the three phases, and
when causing the inverter to commence the supply of alternating current to the three phases from a state where the supply of alternating current to the three phases is not performed,
(i) first, the transition control is performed of placing and maintaining a switching element of an upper arm, among the at least three upper arms, and a switching element of a lower arm, among the at least three lower arms, in a conduction state from commencement of the transition control until commencement of the supply of alternating current to the three phases, the switching element of the upper arm corresponding to a phase, among the three phases, through which alternating current is to flow in a first direction entering the three-phase motor upon commencement of the supply of alternating current to the three phases, the switching element of the lower arm corresponding to a phase, among the three phases, through which alternating current is to flow in a second direction exiting the three-phase motor upon commencement of the supply of alternating current to the three phases, and
(ii) then, following the transition control, the alternating current supply control is performed so as to cause the inverter to commence the supply of alternating current to the three phases, the alternating current supply control being control of causing the switching elements to repeatedly switch between the conduction state and a non-conduction state, and
the control of the switching elements included in the inverter is performed by intermittent control of (i) repeatedly performing a set of controls that includes the first control, the transition control and the alternating current supply control performed in the stated order, and (ii) ensuring that, in every repetition of the set of controls, an average of a torque output by the three-phase motor during the period equals a demanded torque.

8. The method according to claim 7, wherein
in a case where alternating current is to flow through two phases, among the three phases, in one direction among the first direction and the second direction upon commencement of the supply of alternating current to the three phases,
the transition control is performed such that first, a first switching element corresponding to one phase, among the two phases, through which relatively large alternating current is to flow upon commencement of the supply of alternating current to the three phases is placed and maintained in the conduction state, and then, following a predetermined interval, a second switching element corresponding to the other phase, among the two phases, through which relatively small alternating current is to flow upon commencement of the supply of alternating current to the three phases is put in the conduction state.

9. The method according to claim 7, wherein
in a case where alternating current is to flow through two phases, among the three phases, in one direction among the first direction and the second direction upon commencement of the supply of alternating current to the three phases,
the transition control is performed such that a first switching element corresponding to one phase, among the two phases, through which relatively large alternating current is to flow upon commencement of the supply of alternating current to the three phases is placed and maintained in the conduction state, and a second switching element corresponding to the other phase, among the two phases, through which relatively small alternating current is to flow upon commencement of the supply of alternating current to the three phases is caused to repeatedly switch between the conduction state and the non-conduction state.

10. The motor drive system of claim 1, wherein
the control unit acquires a signal indicating the demanded torque, in every repetition of the set of controls, the control unit, (i) in the first control, controls the inverter such that the torque output by the three-phase motor equals zero, and (ii) in the second control, controls the inverter such that the torque output by the three-phase motor is greater than the demanded torque, and the control unit ensures that, in every repetition of the set of controls, the average of the torque output by the three-phase motor during the period equals the demanded torque by adjusting respective durations of the first control, the third control, and the second control.

11. The motor drive system of claim 1, wherein
the control unit determines a timing at which the second control is to be commenced according to a constant cycle, and
the control unit sets a duration of the third control in every repetition of the set of controls by, for each of the three phases of the three-phase motor, (i) estimating a value of a current flowing through the phase at the timing at which the second control is to be commenced, (ii) setting the value so estimated as a target current value, and (iii) estimating the time required for the current flowing through the phase to reach the target current value from a value of zero.

12. The motor drive system of claim 1, wherein
every repetition of the set of controls has the same fixed duration.

13. The method according to claim 7, wherein
a signal indicating the demanded torque is acquired,
in every repetition of the set of controls, in the alternating current control, the inverter is controlled such that the torque output by the three-phase motor is greater than the demanded torque, and
in every repetition of the set of controls, it is ensured that the average of the torque output by the three-phase motor during the period equals the demanded torque by adjusting respective durations of the transition control and the alternating current control.

14. The method according to claim 7, wherein
a timing at which the alternating current control is to be commenced is determined according to a constant cycle, and
a duration of the third control in every repetition of the set of controls is set by, for each of the three phases of the three-phase motor, (i) estimating a value of a current flowing through the phase at the timing at which the alternating current control is to be commenced, (ii) setting the value so estimated as a target current value, and (ii) estimating the time required for the current flowing through the phase to reach the target current value from a value of zero.

15. The method according to claim 7, wherein
every repetition of the set of controls has the same fixed duration.

* * * * *